May 23, 1939.　　　　W. J. BAKER　　　　2,159,543
VULCANIZING MACHINE
Filed Oct. 1, 1937　　　3 Sheets-Sheet 1

Inventor
W. J. BAKER
by
Kenway & Witter,
Attorneys

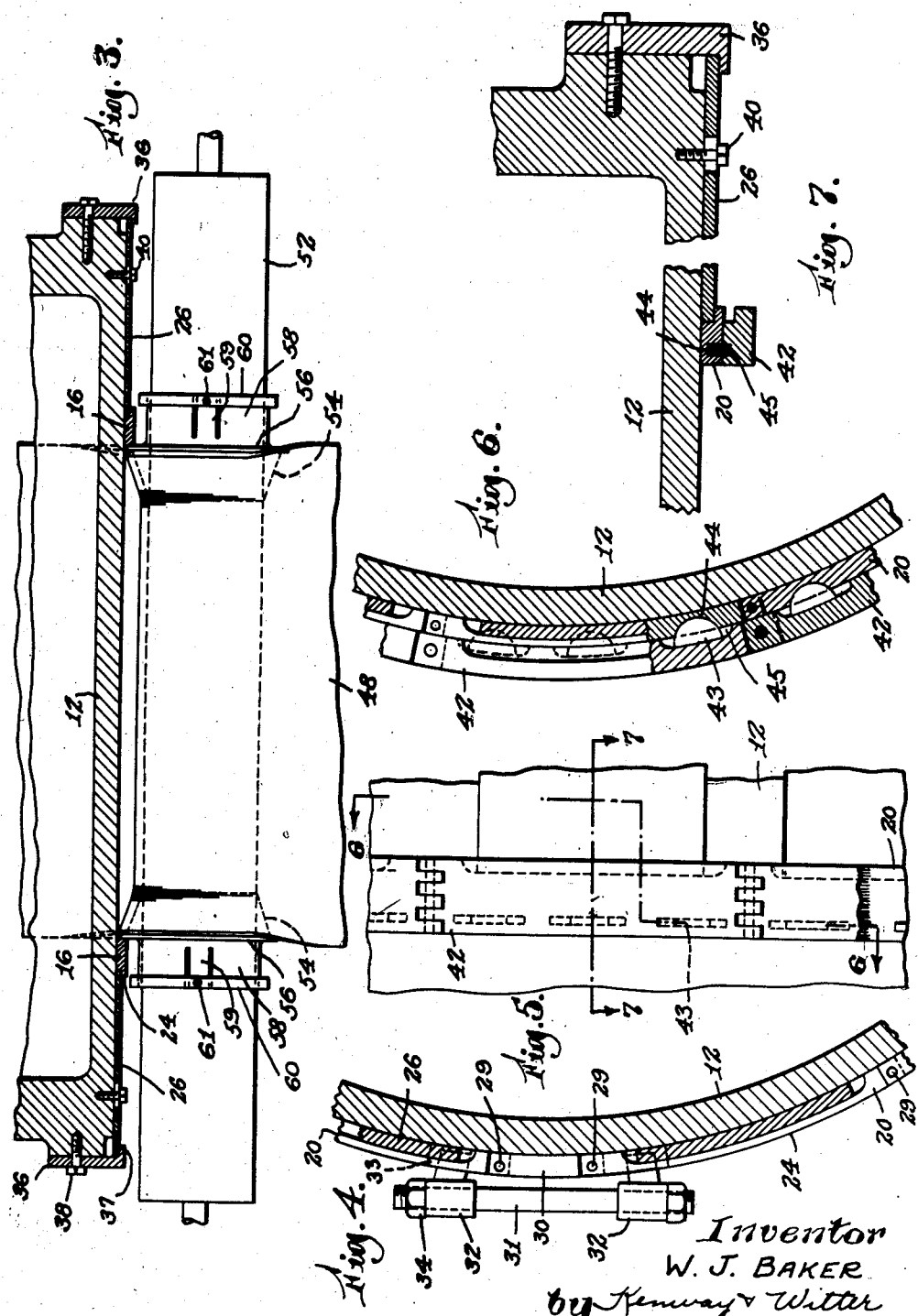

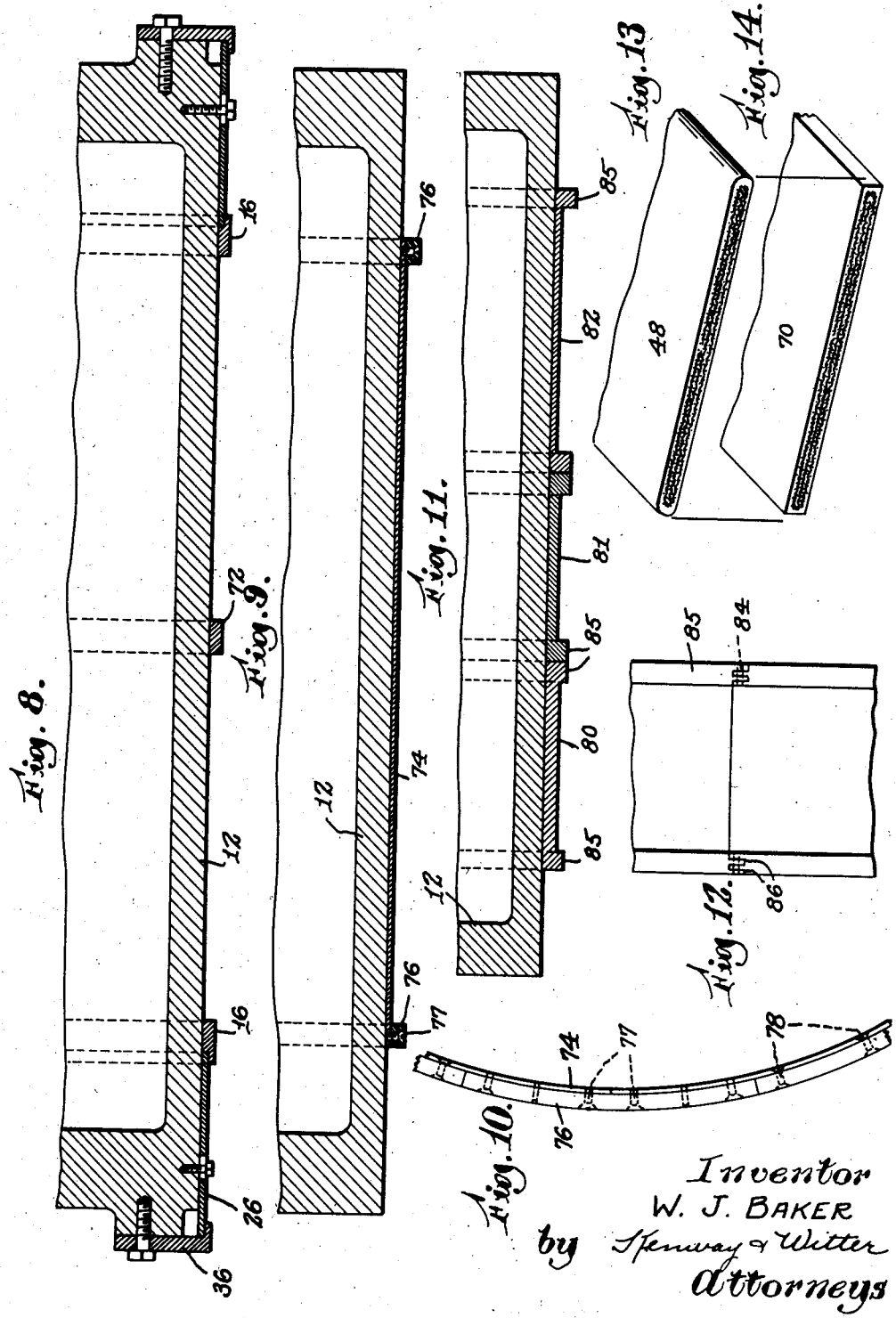

Patented May 23, 1939

2,159,543

UNITED STATES PATENT OFFICE 2,159,543

VULCANIZING MACHINE

Walter J. Baker, West Somerville, Mass., assignor to Boston Woven Hose & Rubber Company, Cambridge, Mass., a corporation of Massachusetts Application October 1, 1937, Serial No. 166,802

16 Claims. (Cl. 18—6)

This invention relates to apparatus for vulcanizing strip material under pressure and more particularly to the manufacture of conveyor belting. Such belting is relatively thick and is constructed of several plys of fabric covered on both faces and both edges with rubber, the purpose of the cover being to protect the belting against wear and to seal the fabric against the ingress of moisture which would cause rapid deterioration. The invention contemplates apparatus not only for the continuous curing of the belting but furthermore the curing thereof to an absolutely uniform and predetermined width and thickness and the formation of full and completely protected and thoroughly vulcanized edges. Such treatment employs a continuous and trough-like molding channel of predetermined width and depth into which is crowded under pressure uncured belting of a width greater than the width of the cured belting, a top wall serving to close the channel and hold the belting under pressure therein during the curing treatment. The molding channel is formed on and around a vulcanizing drum and my invention contemplates novel ring-like means on and cooperating with the drum to provide one or more molding channels of the desired width and depth.

In accordance with the preferred embodiment of my invention, one or more rings are mounted on and in close contact with the cylindrical surface of the vulcanizing drum to provide one or more vulcanizing channels therearound. The rings are preferably of segmental construction embodying means for holding them in close contact with the drum and the channel may be formed between adjacent rings or directly within the rings, all as hereinafter described. In either case an endless band is adapted to cooperate with the rings to crowd the belting into and form the top closing walls of the molding channels.

In the preferred form of the invention, the width of the channels can be varied by varying the relative spacing of the rings along the drum, and additional but narrower channels may be provided by placing intermediate rings on the drum between the outside rings. The depth of the channels may also be varied by building the rings up to greater thickness by superposing outer rings of predetermined thickness onto the inner rings. Another feature of the invention relates to novel means for securing the outside rings against outward movement along the drum, it being understood that the considerable pressure exerted on the belting tends to force these rings outwardly along the drum.

These and other features of the invention will be best understood and appreciated from the following description of preferred embodiments thereof selected for purposes of illustration and shown in the accompanying drawings in which Fig. 1 is a fragmentary side elevation of a machine embodying my invention, Fig. 2 illustrates the vulcanizing drum in side elevation and in section along line 2—2 of Fig. 1, Fig. 3 is an enlarged fragmentary plan section taken on line 3—3 of Fig. 1, Fig. 4 is a fragmentary sectional view through the vulcanizing drum illustrating the manner of applying the channel-forming rings thereto, Fig. 5 is a fragmentary elevation of the vulcanizing drum showing a segmental ring thereon built up to greater thickness by superposed ring segments, Fig. 6 is a sectional view taken on line 6—6 of Fig. 5, Fig. 7 is a sectional view taken on line 7—7 of Fig. 5, Fig. 8 is a fragmentary view of the drum in longitudinal section and showing a modified form of the invention, Fig. 9 is a like view showing a further modified form of the invention, Fig. 10 is an edge elevation of the ring shown in Fig. 9, Fig. 11 is a fragmentary view of the drum in longitudinal section and showing a further modified form of the invention.

Fig. 12 is a fragmentary plan elevation of one of the rings shown in Fig. 11,

Fig. 13 illustrates a portion of uncured belting, and

Fig. 14 illustrates the same belting after being treated in the apparatus herein disclosed.

Figures 1, 2:
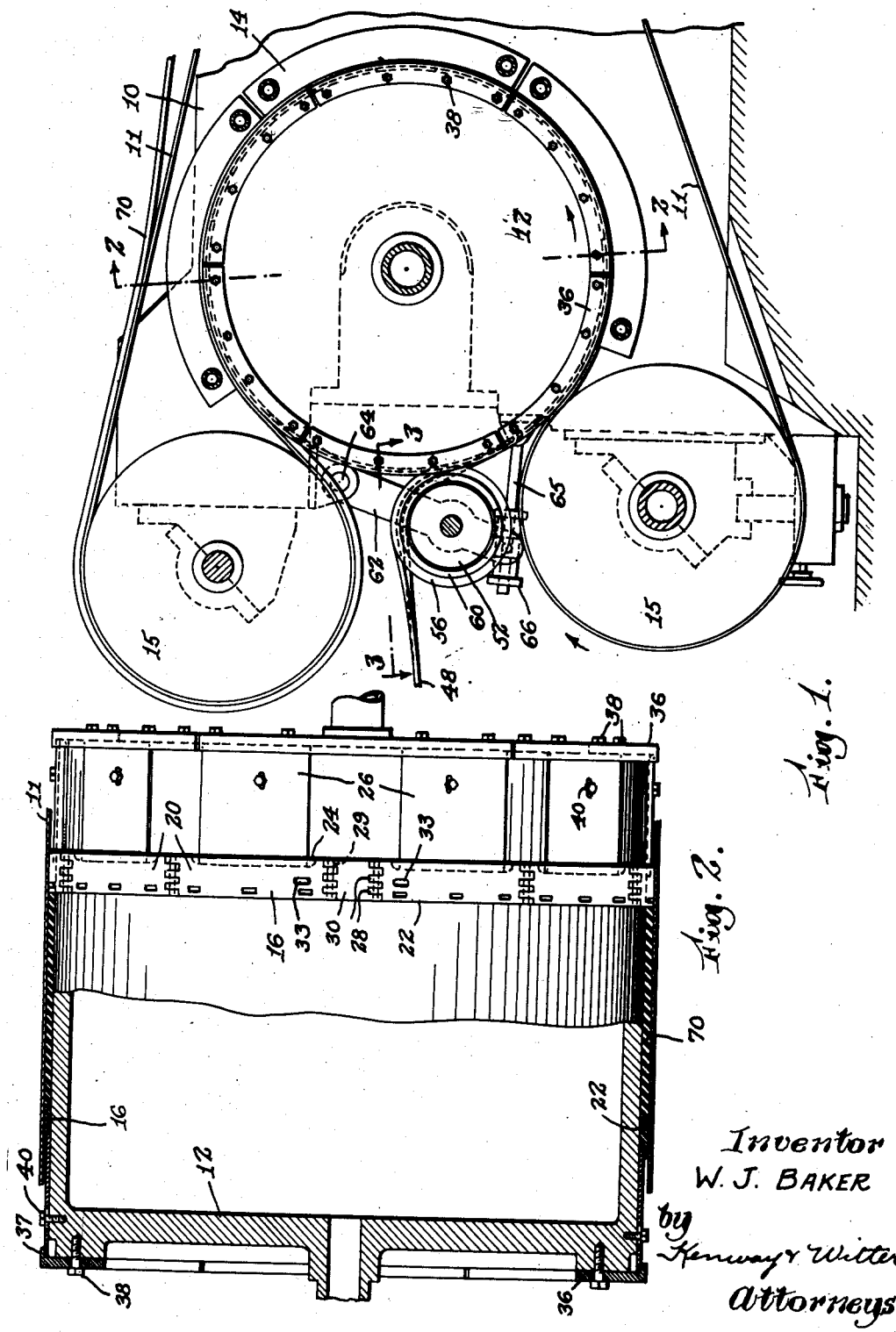

In the drawings, the heavy metal frame of the machine comprises side members 10 of similar shape rigidly connected and supported upon a concrete foundation. The frame is designed to support three rolls over which passes a relatively wide steel tension band 11 in a generally triangular path with a re-entrant loop extending about the periphery of a large vulcanizing drum or cylinder 12 supported by the frame within the general outline of the path of the band. The vulcanizing drum 12 is steam heated and cooperating with a relatively large segmental portion thereof is a steam heated jacket 14. Two of the band supporting rolls are located adjacent to and forwardly of the vulcanizing drum at 15 and a third roll (not shown) is located rearwardly of the drum, the tension band being supported on these rolls and engaging the drum beneath the jacket 14. The band is brought to and held under the desired tension by hydraulic pressure means illustrated in Patent No. 2,039,271. The drum is rotated slowly in the direction indicated by the arrow and the strip to be vulcanized is fed into the bite formed between the band and the drum as the band leaves the lower roll 15.

The vulcanizing drum is provided with one or more open channels extending continuously therearound and each is bounded on three sides by a bottom wall and two side walls. In accordance with my invention as illustrated, I form these channels by the application of rings to the cylindrical vulcanizing surface of the drum. In Figs. 2–4, I have illustrated two such rings 16 applied to the drum in relatively spaced relation whereby forming a channel therebetween, the rings forming the side walls of the channel and the cylindrical surface therebtween forming the bottom wall. The use of such rings provides for a variation in the width as well as the depth of the channel, all as hereinafter described. Furthermore, for open side presses the rings may be of one piece construction, but otherwise they will preferably be formed in sections which may be placed on and removed from drums supported at both ends in the press.

The rings are preferably constructed in segments, as illustrated, each segment 20 thereof being curved to fit the drum and having an inner edge wall 22, the outer edges being rabbeted to provide overhanging flanges 24 for engaging spacing plates 26. The ends of the segments are notched to provide interlocking fingers 28 and the fingers are perforated to receive pintles 29. The ring segments are applied to the drum and interlocked together and the gap between the two ends is filled by a short segment 30 of exactly the necessary length. This short segment is applied by the means and in the manner illustrated in Fig. 4. This means comprises a bolt 31 threaded at its ends and carrying elements 32 having lugs adapted to project into recesses 33 in the segments. Tightening of the nuts 34 draws the ring tightly onto the drum and brings the perforations into alignment whereupon the pintles 29 are inserted.

As illustrated in Figs. 2 and 3, two such rings mounted in spaced relation on the vulcanizing drum provide a channel of predetermined width therebetween and the following described means prevents outward movement of the rings along the drum. A spacing plate 26 is provided for each ring segment 20 and the inner end of this plate rests beneath the flange 24 and abuts against the ring segment. The outer ends of the plates are engaged by end stop plates 36 having flanges 37 overhanging the plates 26 and bolted to the drum at 38. Screws 40 are provided for supporting the plates 26 while the stop plates are being applied. It will be apparent that the plates 26 and 36 serve to hold the rings to the original predetermined spacing on the drum and it will also be apparent that this spacing may be varied by substituting plates 26 of different lengths.

Belting of predetermined different thickness may also be produced by using channel-forming rings of different thickness by superposing the proper combinations of rings one upon another. In Figs. 5–7 I have illustrated a second ring embodying segments 42 as superposed on the ring embodying segments 20, it being noted that the segments 20 and 42 are alike except for the difference in thickness. The outer ring is prevented from movement on the inner ring longitudinally of the vulcanizing drum by the use of keys 43 carried within key slots 44 in the segments 20 and extending into keyways 45 in the segments 42, the keyways 45 being longer than the keys whereby permitting the outer ring segments to move circumferentially when tightening the same by means of the tool 31. It will be understood that channels of any predetermined depth may be formed by combining rings of a combined thickness to produce such depth.

The open channel above described provides the bottom and two side walls of a mold and the tension band 11 is arranged to form the top wall thereof. The production of a satisfactory belting furthermore requires that the mold shall be completely filled and the belting brought firmly into intimate contact with the mold walls throughout their entire areas and especially at the side walls thereof which form the edges of the belting. As illustrated in the drawings, this step is accomplished by crowding the uncured belting, preferably of a width greater than the width of the mold channel, into the channel, and thereafter crowding the intermediate portion thereinto by engaging the tension band therewith, the belting being thereupon molded into intimate contact with the side walls 22. During such feeding of the edges into the channel the intermediate portion of the belting is permitted to bulge outwardly and subsequently the tension band crowds the belting wholly into the channel under heavy pressure and provides the top wall of the mold, whereby enclosing the belting at all four sides. These steps and the vulcanizing of the belting while wholly enclosed and under pressure are furthermore carried out continuously whereby producing a belting uniform in dimensions and character throughout.

The belting is fed into the channel by the following described mechanism. Mounted on the roll 52 adjacent and opposite to the channel forming rings 18 are two elements 54. These elements have conical surfaces facing each other, flanges 56 extending into the molding channel and respectively in contact with the side walls 22, and outwardly extending sleeve portions 58. The sleeve portions are slitted to provide a flexible leaf 59 integral with each element and a ring 60 surrounding each sleeve portion has a screw 61 threaded thereinto and engaging the leaf 59. Tightening of these screws is adapted to bind the elements against movement relative to the roll 52. This roll is rotatably supported at its ends by two arms 62, pivoted to the frame at 64, the lower ends of the arms being engaged by rods 65 anchored to the frame and provided with adjusting means 66 whereby the roll may be anchored in adjusted proximity to the drum. The process and apparatus illustrated and described but not claimed herein is the invention of John M. Bierer and is described and claimed in his copending application, Ser. No. 144,184, filed May 22, 1937.

The operation of the apparatus is believed to be obvious. The belting 48 being treated passes over the feeding roll 52, around and in contact with the vulcanizing drum beneath the jacket 14, and from thence rearwardly, the belting being drawn along by power applied to the vulcanizing drum. Tensioning rolls shown in said copending application serve to place the belting under a predetermined tension and as it passes over the roll 52 the conical surfaces 54 elevate the edges and permit the intermediate portion to sag, especially since the belting is under tension, as illustrated in Figs. 1 and 3. The elements 54 thereupon act to feed the edge portions of the belting into the molding channel while permitting the intermediate portion to bulge outwardly. The belting thereupon passes into the bite formed between the tension band and the drum whereupon the tension band engages the bulged portion of the belting and forces it into straight alignment transversely and into the channel. The belting is thus crowded into and completely fills the molding channel, particularly at the side walls, and the band 11 thereupon becomes the top wall of the mold completely enclosing the belting within the channel. The belting, now in vulcanizing contact with the mold on both faces and edges, passes through the vulcanizing path beneath the jacket 14 and is thoroughly and completely vulcanized. The finished belting 70 (Fig. 14) is somewhat narrower than the uncured belting 48 and its edges are fully and completely formed and protected by a substantial rubber coating.

It may be desired to mold a plurality of belts simultaneously on the drum and, as one method of proceeding in this manner, I have in Fig. 8 illustrated a third ring 72 as mounted on the drum between the two outside rings 16, thus providing two molding channels at opposite sides of the ring 72. A larger number of channels may be formed by providing more intermediate rings.

While it is preferred to employ the cylindrical surface of the drum as the bottom wall of the molding channel, it will be understood that rings may be provided and mounted on the drum having bottom walls as well as side walls. In Figs. 9 and 10 I have illustrated such a ring comprising a plurality of segments each of which has a bottom wall member 74 and two side wall members 76. The member 74 is constructed of relatively thin sheet stock and the members 76 are secured to the side edge portions thereof as by screws 77 and rivets 78. The segments are mounted on and held in contact with the drum by any suitable means to provide a continuous channel therearound. The use of this ring for the purpose described is substantially the same as already described above.

In Fig. 11, I have illustrated a plurality of segmental rings 80, 81, and 82 as mounted on the drum and providing a plurality of continuous molding channels therearound. The channels may be of uniform width and depth, as in the rings 80 and 81, and these dimensions may be varied as desired, the channel in ring 82 being wider and deeper than the channels in rings 80 and 81. The segments comprising each of these rings may be joined together by pintles 84 extending through inter-engaging lugs 86 in the side wall portions of the rings substantially as illustrated in Fig. 2 and heretofore described. The tension band 11 is adapted to ride on the side wall portions 85 of the rings.

Having thus described my invention what I claim as new and desire to secure by Letters Patent of the United States is,

1. A vulcanizing drum having a cylindrical vulcanizing surface, relatively spaced rings extending about said surface and providing channel side walls cooperating with a bottom wall formed by said surface therebetween, one of said rings comprising a plurality of segmental sections connected together at their ends and drawn tightly into contact with said surface, and means securing the segmental ring against outward movement along the drum.

2. A vulcanizing drum having a cylindrical vulcanizing surface, relatively spaced rings extending about said surface and providing channel side walls cooperating with a bottom wall formed by said surface therebetween, one of said rings comprising a plurality of segmental sections, and means connecting said sections together at their ends and holding them in close contact with said surface.

3. The combination defined in claim 2 wherein the ring sections are slotted at their ends to provide inter-engaging lugs, and pintles extending through aligned holes in the lugs and securing the sections together at their ends.

4. A vulcanizing drum having a cylindrical vulcanizing surface, a segmental ring extending about and in close contact with said surface, a second segmental ring supported on and in close contact with the first ring and building it up to greater thickness.

5. A vulcanizing drum having a cylindrical vulcanizing surface and relatively spaced rings extending about said surface and providing channel side walls cooperating with a bottom wall formed by said surface therebetween, one of said rings being adjustable longitudinally of the drum and being built up to a desired thickness by an outer segmental ring portion superposed over an inner ring portion and drawn into tight engagement therewith.

6. A vulcanizing drum having a cylindrical vulcanizing surface, relatively spaced rings extending about said surface and providing channel side walls cooperating with a bottom wall formed by said surface therebetween, one of said rings being adjustable longitudinally of the drum and being built up to a desired thickness by an outer segmental ring portion superposed over an inner ring portion and drawn into tight engagement wherewith, and keys between the outer and inner ring portions and arranged to permit relative circumferential movement of the portions but preventing relative movement thereof longitudinally of the drum.

7. A vulcanizing drum having a cylindrical vulcanizing surface, two relatively spaced rings extending about and in contact with said surface and providing channel side walls cooperating with a bottom wall formed by said surface therebetween and forming a circumferential channel, one or more rings extending about and in contact with said surface between and spaced from the first named rings and dividing said circumferential channel into a plurality of circumferential channels, and means securing the outside rings against outward movement along the drum, the rings being of uniform thickness above said surface.

8. In a vulcanizing machine, a vulcanizing drum, a plurality of rings mounted on the drum and providing one or more annular molding channels each of uniform depth thereacross and around the drum, and an endless band extending around a substantial arcuate portion of the drum and tensioned into tight contact with the top surfaces of said rings whereby providing closing top walls for said channels.

9. In a vulcanizing machine, a vulcanizing drum, a plurality of removable rings mounted in relatively spaced relation on the drum and providing in conjunction with the cylindrical surface of the drum one or more annular molding channels each of uniform depth thereacross and around the drum, an endless band extending around a substantial arcuate portion of the drum and tensioned into tight contact with the top surfaces of said rings whereby providing closing top walls for said channels.

10. In a vulcanizing machine, a vulcanizing drum, three or more rings mounted in relatively spaced relation on the drum and providing in conjunction with the cylindrical surface of the drum a plurality of molding channels each of uniform depth thereacross and around the drum, an endless band extending around a substantial arcuate portion of the drum and tensioned into tight contact with the top surfaces of said rings whereby providing closing top walls for said channels, and means securing the two outside rings against outward movement on the drum.

11. In a vulcanizing machine, a vulcanizing drum, a ring mounted on and secured with its bottom face in close contact with the drum, the ring having the intermediate portion of its outer face channeled therearound whereby providing an annular molding channel of uniform depth around the drum, and an endless band extending around a substantial arcuate portion of the drum and tensioned into tight contact with the non-channeled top surface of the side walls of the ring whereby providing a closing top wall for the channel.

12. The machine defined in claim 11 in which the side walls of said ring comprise independent pieces secured in close face-to-face contact with the bottom wall of the ring.

13. In a vulcanizing machine, a vulcanizing drum, a plurality of rings mounted on and secured with their bottom faces in close contact with the drum, the rings having the intermediate portions of their outer faces channeled therearound whereby providing an annular molding channel of uniform depth in each ring around the drum, and an endless band extending around a substantial arcuate portion of the drum and tensioned into tight contact with the non-channeled top surfaces of the side walls of the rings whereby providing closing top walls for the channels.

14. In a vulcanizing drum, a ring comprising a plurality of segments each having a concave arcuate face corresponding to the arcuate curvature of the drum, and means joining the ends of the segments and holding said arcuate faces of the ring segments in close contact with the cylindrical surface of the drum.

15. In a vulcanizing machine, a vulcanizing drum having a cylindrical vulcanizing surface, annular means including a ring in contact with said surface providing an annular channel the bottom wall of which is said surface and the side walls of which are formed by said means, the ring being adjustable longitudinally of the drum to vary the width of the channel, and an endless band extending around a substantial arcuate portion of the drum and tensioned into tight contact with the top surface of said means whereby providing a closing top wall for the channel.

16. The machine defined in claim 15, plus means providing abutments adjacent to one end of the drum, and spacing plates between the abutments and the adjustable ring preventing outward movement of such ring.

WALTER J. BAKER.